United States Patent [19]

Rudolf et al.

[11] Patent Number: 5,377,372
[45] Date of Patent: Jan. 3, 1995

[54] HOSPITAL BED CASTOR CONTROL MECHANISM

[75] Inventors: Kenneth O. Rudolf; David W. Williams, both of Batesville, Ind.

[73] Assignee: Hill-Rom Company, Inc., Batesville, Ind.

[21] Appl. No.: 41,008

[22] Filed: Mar. 31, 1993

[51] Int. Cl.[6] ............................ A61G 7/06; B60B 33/00
[52] U.S. Cl. .............................. 5/600; 5/86.1; 16/35 R
[58] Field of Search .................. 5/600, 86.1; 16/35 R; 280/47.11, 79.11

[56] References Cited

U.S. PATENT DOCUMENTS

| | | | |
|---|---|---|---|
| 3,055,042 | 9/1962 | Burzlaff | 16/35 R |
| 4,276,962 | 6/1981 | Aulick | 16/35 R |
| 4,309,791 | 1/1982 | Aulik | 16/35 R |
| 4,439,879 | 4/1984 | Werner | 5/600 |
| 4,922,574 | 5/1990 | Heiligenthal et al. | 16/35 R |
| 4,998,320 | 3/1991 | Lange | 16/35 R |

*Primary Examiner*—Michael F. Trettel
*Attorney, Agent, or Firm*—Wood, Herron & Evans

[57] ABSTRACT

A castor control mechanism for a hospital bed having a plunger type neutral/brake/steer castor comprises a linkage including a rocker arm pivotally mounted to the base of the bed, a link connected on one end to the rocker arm and being connected on its other end through a cam and follower mechanism to a shaft rotatably mounted to the base and rotatable by a foot pedal. Operation of the foot pedal moves the plunger of the castor via the rocker arm to place the castor in its steer, neutral and brake positions.

30 Claims, 6 Drawing Sheets

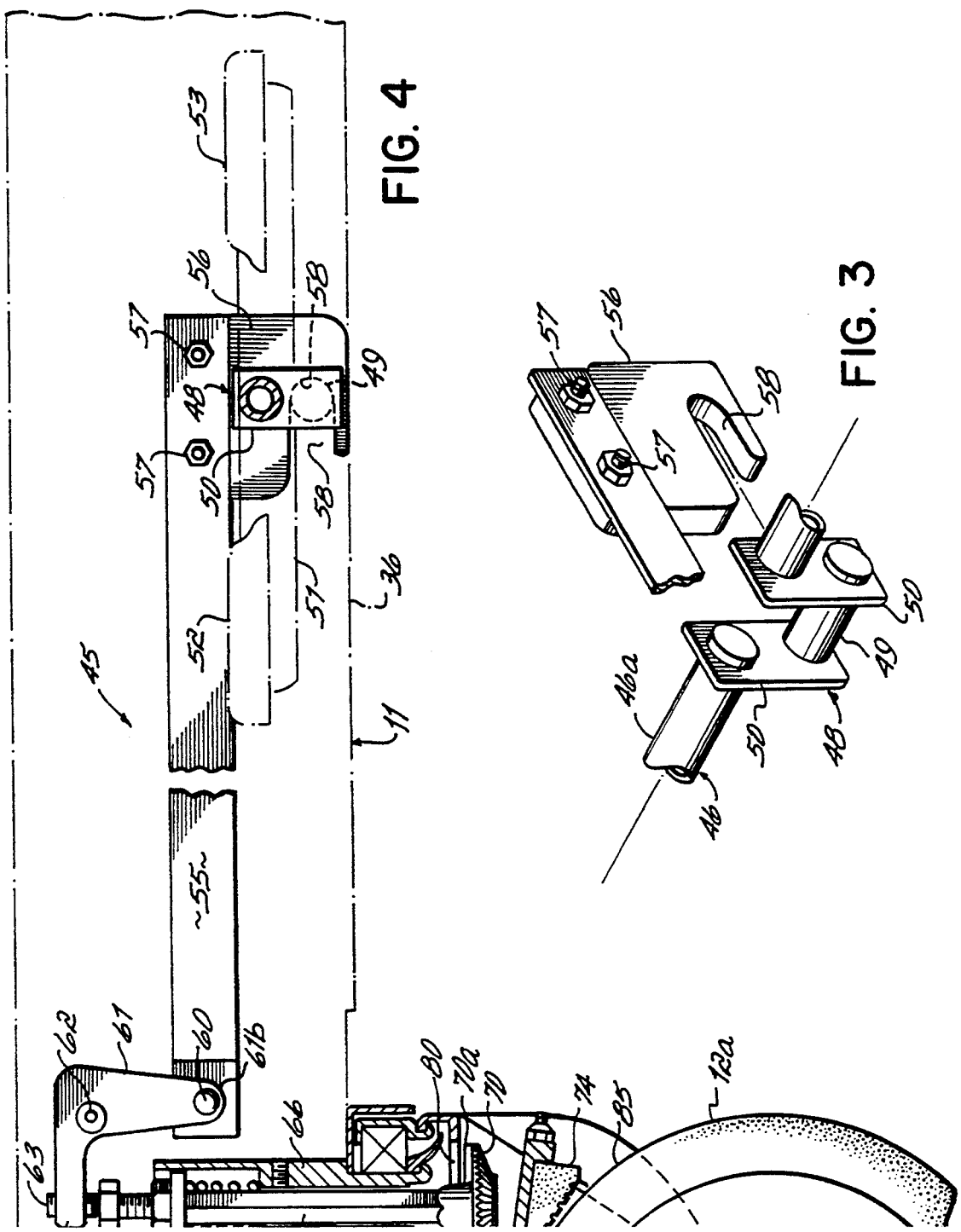

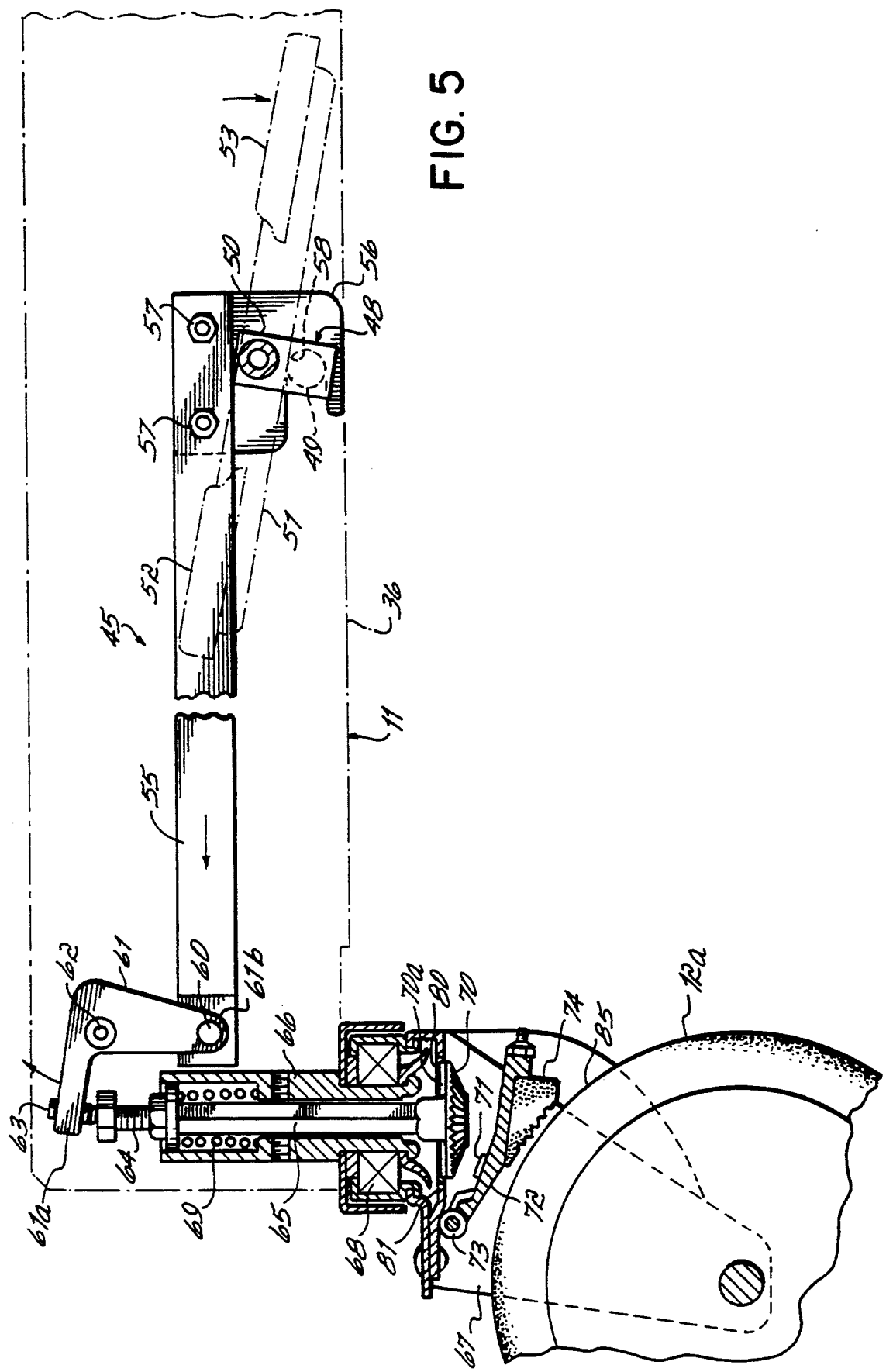

HOSPITAL BED CASTOR CONTROL MECHANISM

FIELD OF THE INVENTION

This invention relates generally to hospital beds. More particularly, this invention relates to a control mechanism for controlling the castors on the base of the hospital bed, and more specifically for selecting a particular operating mode for the castors.

BACKGROUND OF THE INVENTION

Hospital beds, whether of the medsurg type, stretcher type or birthing type, have heretofore been provided with castors mounted around the base for rolling the bed from place to place. At least one of the castors, and usually two, have at least two operating modes. In most cases, one of the castors will have three operating modes.

More particularly, at least one of the castors is of the type having three operating modes, known as "neutral" "brake", and "steer". In the neutral mode, the castor is free to swivel. In the brake mode, the brake castor pad is pressed against the surface of the castor wheel to prevent it from rotating and swiveling. In the steer mode, the castor is locked against swiveling movement, and aligned parallel to the longitudinal dimension of the bed so that the bed can be pushed straight down a hallway without the bed drifting to one side or the other. In two operating mode castors, the steer mode or function is eliminated, and the castor simply has neutral and brake modes.

Two types of castors, each of which includes the capability of having the above three operating modes, have been employed in hospital beds. The simplest type is known as a "plunger" type castor. In this type of castor, the castor spindle is spring loaded upwardly and normally maintains the castor locked in the steer mode. Depressing the spindle through a first displacement frees the castor from its steer mode and places it into its free-to-swivel neutral mode. Depressing the spindle through a second displacement places the castor in its brake mode by forcing the castor brake against the castor wheel thereby stopping castor wheel rotation and swiveling movement.

A more expensive castor which likewise includes the steer, neutral and brake modes is the "cam" type castor. In the cam type castor, there is an additional housing located above the spindle which houses a cam. The cam normally includes a hex-shaped through-bore for cooperation with a similarly hex-shaped shaft. The hex-shaped shaft is inserted through the cam hex bore, and rotation of the shaft rotates the cam, the lobes of which then move the spindle through the required displacements hence moving the castor from the steer to the neutral mode and from the neutral mode to the brake mode.

Hospital beds which have employed plunger type castors have also employed cable type actuating systems for actuating a rocker arm which in turn depresses the spindle to move the castor into its three operating modes. Such cable systems have typically been provided with a foot pedal for actuating the cable assembly. Normally, the pedal when in a centermost position corresponds to the castor being in its neutral mode; depressing the pedal in a first direction causes the cable assembly to move the castor via the rocker arm to its steer mode, and depressing the pedal in a second direction from a neutral position causes the cable assembly to move the castor via the rocker arm to the brake position. Such a cable assembly is subject to criticism, however, as these types of assemblies generally require numerous parts, thereby increasing the cost and complexity of the system. Furthermore, as the cables in these cable assemblies are prone to stretching over time, the tension in the cable must constantly be adjusted to provide for proper operation of the castors.

With respect to cam type castors, so-called direct drive or linkage mechanism systems have been employed to actuate these types of castors. In these systems, a rigid link is connected between the pedal and hex shaft for rotating the hex shaft and hence the cam of the castor. Such direct drive linkage assemblies have met with success in that there is a great reduction in the number of parts over that found in a typical cable assembly, the systems are less expensive, and the systems do not require constant cable tension adjustment. However, in many situations, such as, for example, retrofit situations, the cam type castor is not a feasible alterative to a plunger type castor as the larger, bulkier cam type castor cannot be substituted for the plunger type castor due to packaging constraints, etc., therefore ruling out the use of the larger cam type castor and its associated cam shaft.

SUMMARY OF THE INVENTION

It has therefore been a main objective of the present invention to provide a direct drive or linkage mechanism for controlling at least one of the castors of a hospital bed, specifically the plunger type castor having neutral, brake and steer modes. Such a mechanism greatly reduces the number of parts over the cable assemblies presently in use for actuating the plunger type castors, and eliminates the costly and tedious cable tension adjustment of the cable assemblies as well. Further, with such a direct drive mechanism, "slop", inherent in any type of cable drive assembly, is virtually eliminated, thus yielding a much more positive control mechanism.

According to a preferred embodiment of the present invention, there is provided a hospital bed comprising a base, a patient support mounted above the base, castors mounted around the base and including at least one plunger type castor having neutral, brake and steer modes, and a linkage for selectively positioning the plunger type castor in each of the neutral, brake and steer modes.

It is contemplated that the linkage comprise a shaft mounted transversely of and for rotation with respect to the base; a rocker arm pivotally mounted to the base and having first and second ends, the first end being adapted to actuate the spindle of the plunger type castor, a link having first and second ends, the first link end being connected to the second rocker arm end and means operably associated with the shaft and the second link end for transferring force between the second link end and the shaft whereby upon selective rotation of the shaft the link pivots the rocker arm to selectively position the plunger type castor in the neutral, brake and steer modes.

The operably associated means preferably comprises a cam mounted on the shaft, and a cam follower mounted on the second link end for cooperation with the cam. In its preferred form, the cam is a crank on the shaft and the cam follower is a plate mounted on the second link end having a notch adapted to receive therein the crank.

A further aspect of the invention is the provision in the linkage of means resisting rotation of the shaft when the shaft is in respective angular positions corresponding to the neutral, brake and steer modes of the plunger type castor. The means resisting rotation preferably takes the form of a housing having a shaft bore therethrough for rotatably supporting the shaft, a plunger slidably mounted in the housing and spring biased toward so as to project into the shaft bore, and a plurality of recesses around the circumference of the shaft, with each of the recesses corresponding to one of the neutral, brake and steer modes of the plunger type castor.

The invention further contemplates the provision of a pedal on the shaft for foot actuation of the shaft in first and second directions for selectively positioning the plunger type castor in the neutral, brake and steer modes.

Another aspect of the present invention is predicated upon the linkage of the present invention being operable to actuate a plunger type castor having simply neutral and brake modes.

The present invention provides numerous advantages. First, the linkage is provided for use with a plunger type castor which eliminates the need for a cable type assembly with which to actuate the castor. This greatly reduces the number of parts required for manufacturing a hospital bed, thus reducing the cost. In addition, the need to continually adjust the cable tension is eliminated, thus providing further savings in maintenance time and cost. And, the inherent slop in a cable assembly is thereby obviated. Further, as the linkage has been provided which allows a hospital bed employing a cable system to actuate a plunger type castor to be retrofitted with a direct drive linkage mechanism.

These and other objects and advantages of the present invention will become more readily apparent during the following detailed description taken in conjunction with the drawings herein, in which:

BRIEF DESCRIPTION OF THE DRAWINGS

FIG. 3 is a perspective view, exploded and greatly enlarged, of the cam and cam follower of the linkage of FIG. 2;

FIG. 4 is a side elevational view, in partial cross-section, of the castor and linkage of FIG. 2 with the castor in the neutral mode;

FIG. 5 is a view similar to FIG. 4 but with the castor in the steer mode;

DETAILED DESCRIPTION OF THE INVENTION

Figure 1:
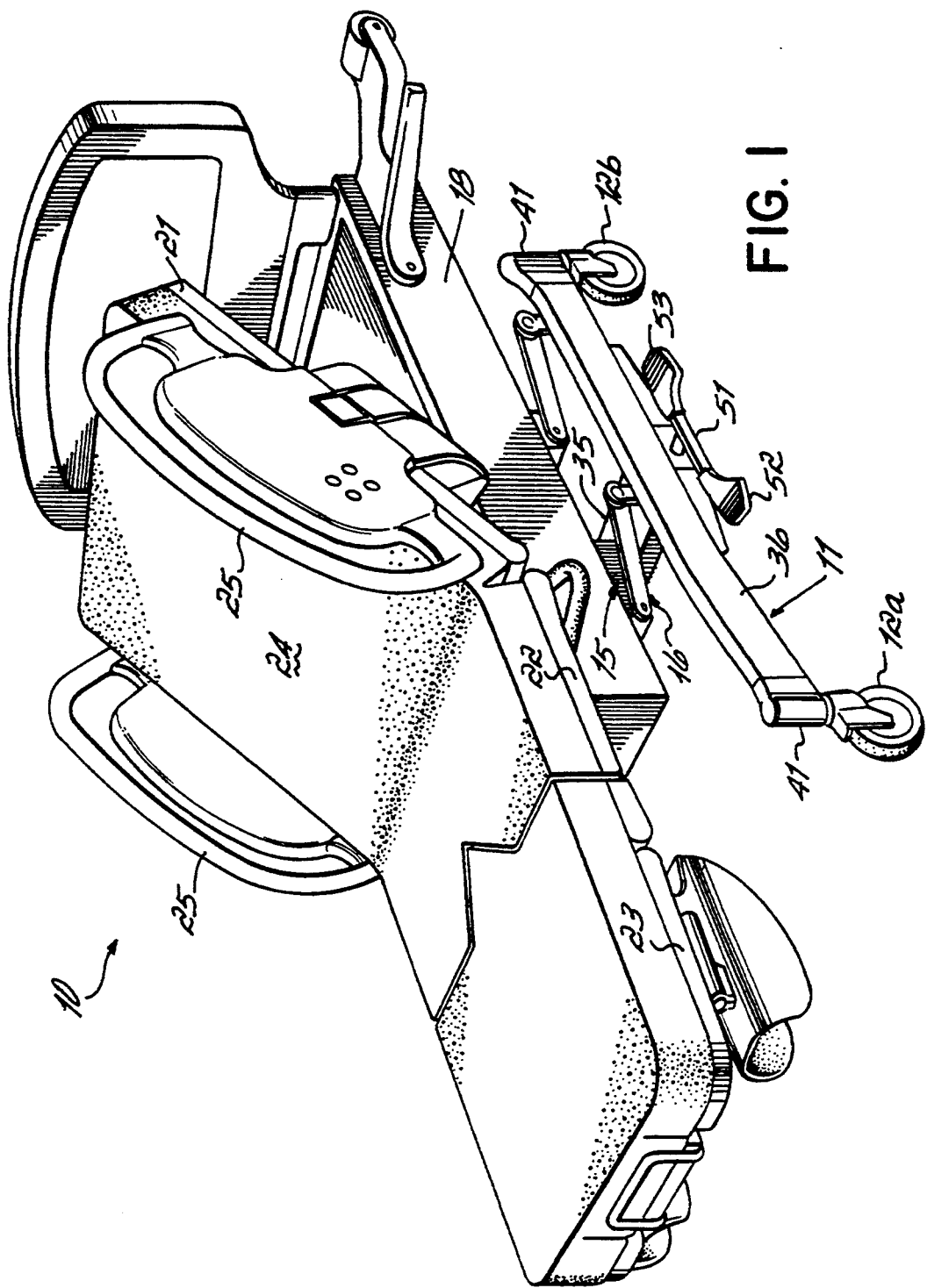
FIG. 1 is a perspective view of a birthing bed employing the present invention.

A hospital bed and specifically a birthing bed 10 is shown in FIG. 1. It has a base 11 with castors 12a–d providing a rolling support. An intermediate frame 15 is supported on the base 11 by a parallelogram linkage 16. A main frame 18 is pivotally connected to the intermediate frame 15 by means not shown.

A head panel 21, seat panel 22 and foot rest 23 are mounted on the main frame 18 and form a deck. A mattress 24 covers panels 21, 22 and 23. The head panel 21 is pivotally mounted on the main frame by means not shown so that it can be pivoted into an upwardly inclined position, shown in FIG. 1. The footrest 23 is mounted to the intermediate frame 15 by means not shown. A pair of side rails 25, 25 are mounted on either side of the head panel 21.

Figure 2:
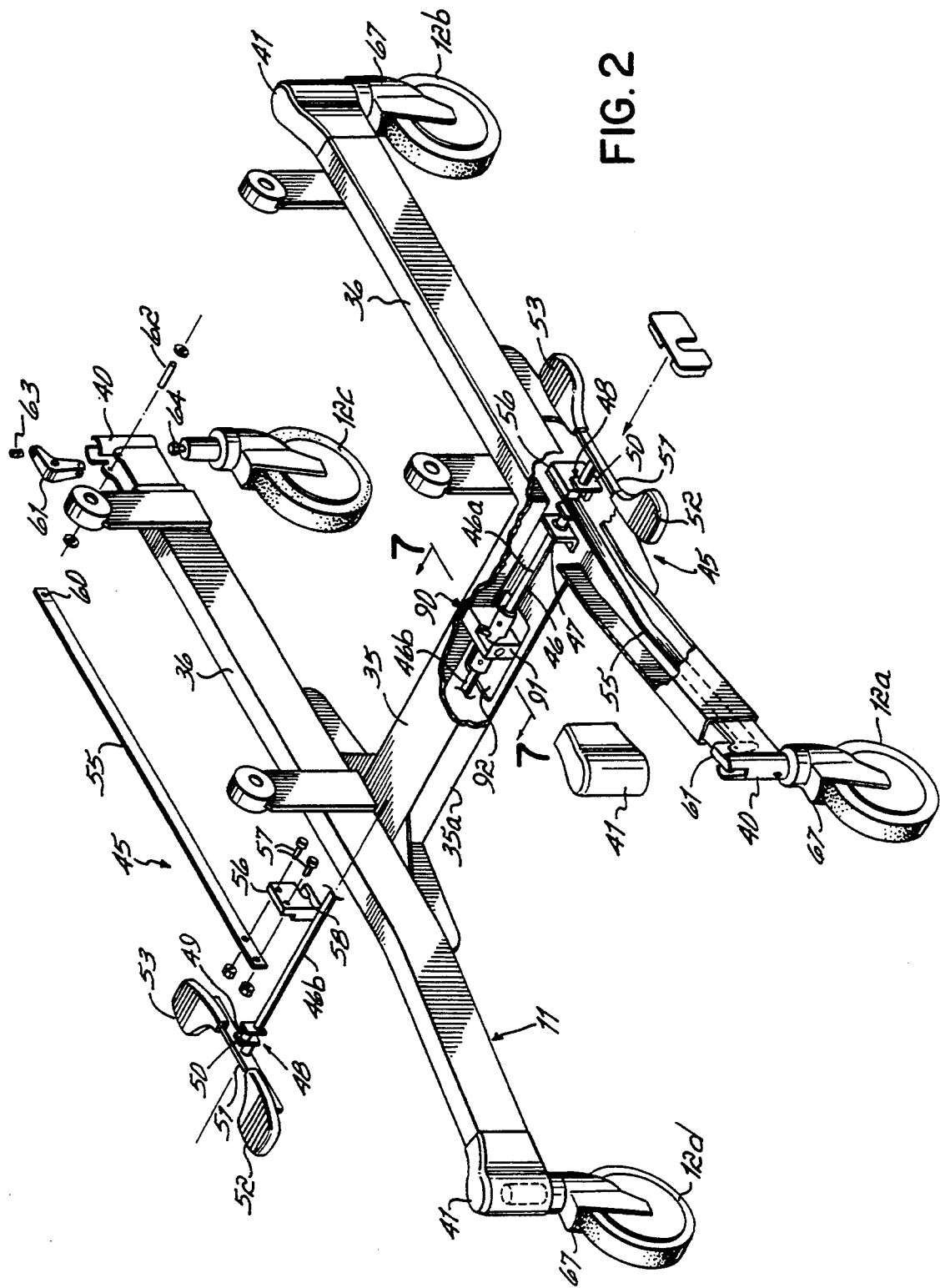
FIG. 2 is a perspective view, partially exploded and partially broken away, of the base of the bed of FIG. 1 illustrating the castor actuating linkage of the present invention.

Referring to FIG. 2, base 11 has a transverse beam 35 interconnecting a pair of longitudinal rails 36, 36. The beam 35 is a primary structural element tying the longitudinal rails 36, 36 together to form the base 11.

Each of the castors 12a–d is mounted within a socket on each end of each rail 36, such as that one shown at 40. An end cap 41 covers the socket 40. Castors 12b and 12d are conventional swivel castors, while castor 12a is that type of castor known as a "plunger" type castor having "neutral", "brake" and "steer" functions, while castor 12c is also a plunger type castor having only the aforementioned neutral and brake modes or functions. The neutral, brake and steer functions will be described subsequently in more detail. It will be appreciated that bed 10 could be provided with more than one neutral/brake castor and/or more than one neutral/brake/steer castor. However, ordinarily the bed 10 is provided with just one neutral/brake castor and with just one neutral/brake/steer castor. It will of course be appreciated that the neutral/brake/steer castor could be placed at 12c, and the neutral/brake castor at 12a, without departing from the spirit or scope of the present invention. Further, it is known to use the term "brake castor" interchangeably with the term "neutral/brake castor", as well as to use the term "brake/steer castor" interchangeably with the term "neutral/brake/steer castor."

A linkage 45 is mounted within the base 11 and is operable to selectively position the neutral/brake/steer castor 12a in its neutral, brake and steer modes, and the neutral/brake castor 12c in its neutral and brake modes. More particularly, the linkage 45 comprises a two-piece shaft 46 made up of shaft halves 46a and 46b. The outwardmost end of shaft half 46a is rotatably supported in a bracket 47 mounted within the transverse beam 35. Outboard of the bracket 47 the shaft includes a cam 48 mounted thereon, which takes the form of a crank 49 offset from and secured to shaft half 46a with a pair of spacer bars 50, 50. A pedal lever 51 is connected to the outboardmost end of the shaft half 46a and includes a pair of pedals 52, 53, the operation of linkage 45 by pedal levers 51 of which will be subsequently described in more detail.

Referring now to FIGS. 2–6, neutral/brake/steer castor 12a is shown in cross-section so that the operation of the linkage 46 used to move the castor 12a to its neutral, brake and steer modes may be visualized. The linkage 45 further includes a link 55. Link 55 has connected to one end a plate 56 with fasteners 57. Plate 56 includes a notch 58 therein which, when assembled, cooperates with crank 49 of shaft half 46a, the operation of which will be more fully described below. The other end of link 55 has pivotally connected thereto at 60 a second end 61b of a rocker arm 61. Rocker arm 61 is pivoted to the horizontal rail 36 at a point near the end of the rail 36. The rocker arm 61 includes an adjusting screw 63 threaded into a first rocker arm end 61a for contacting the adjusting screw 64 of plunger 65 of the neutral/brake/steer castor 12a.

Castor 12a includes a plunger housing 66, and a wheel yoke 67 mounted for swiveling movement with respect to plunger housing 66 via a bearing 68. Plunger 65 is spring loaded upwardly by compression spring 69. On the lower end of the spindle 65 is a bevel gear 70. Bevel gear 70 is operable to cooperate with a tooth 71 which is mounted on a brake pad lever arm 72. Brake pad lever arm 72 is pivoted to the wheel yoke 67 at 73. A brake pad 74 is mounted on the brake pad lever arm 72. With the plunger 65 in the position shown in FIG. 4, the castor 12a is said to be in its neutral position which means that the castor yoke 67 may swivel freely with respect to the spindle housing 66. Neutral/brake/steer castor 12a (or simply "brake/steer castor") is of the type manufactured by Rhombus Casters International, Inc., 20 West Stow Road, Marlton, N.J. 08053 having Part No. 372KR19K150BZ98.

Referring now to FIG. 5, upon depressing pedal 53 downwardly, the adjusting screw 63 of rocker arm 61 is pivoted upwardly, thereby allowing the compression spring 69 of neutral/brake/steer castor 12a to force the spindle 65 upwardly. In doing so, rib 70a on the upperside of the bevel gear 70 is captured in a slot 80 in plate 81 thereby swively fixing wheel yoke 67 relative to spindle 65. This is said to be the steer mode of the castor in that the castor wheel is, at this point, not free to swivel, but rather the yoke 67 is fixed relative to plunger housing 66, the axis of rotation of the castor wheel itself being maintained perpendicular to the longitudinal axis of the bed thereby allowing a care provider to push the bed 10 in a straight line down a hallway without the bed drifting to either side.

In depressing pedal 53 downwardly to place the castor 12a in the steer position, it will be appreciated that crank 49 moves in the direction of the castor 12a. Link 52 simply follows, as the upward force of compression spring 69 acting upon the spindle 65 causes clockwise rotation of the crank 69 which pulls link 55 toward the castor 12a at the connection 60. Depressing pedal 52 downwardly returns the castor 12a to its neutral mode, that is the mode wherein the castor wheel yoke 67 is free to swivel relative to the spindle. During this motion, crank 49 cams plate 56 away from the castor 12a, and in doing so rotates the rocker arm 61 counter clockwise as by the force supplied at 60. Rocker arm adjusting screw 63 acting upon plunger adjusting screw 64 forces the plunger 65 downwardly until rib 70a on the bevel gear 70 clears the slot 80 in plate 81, at which time the yoke 67 is free to swivel about the plunger housing 66.

Figure 6:
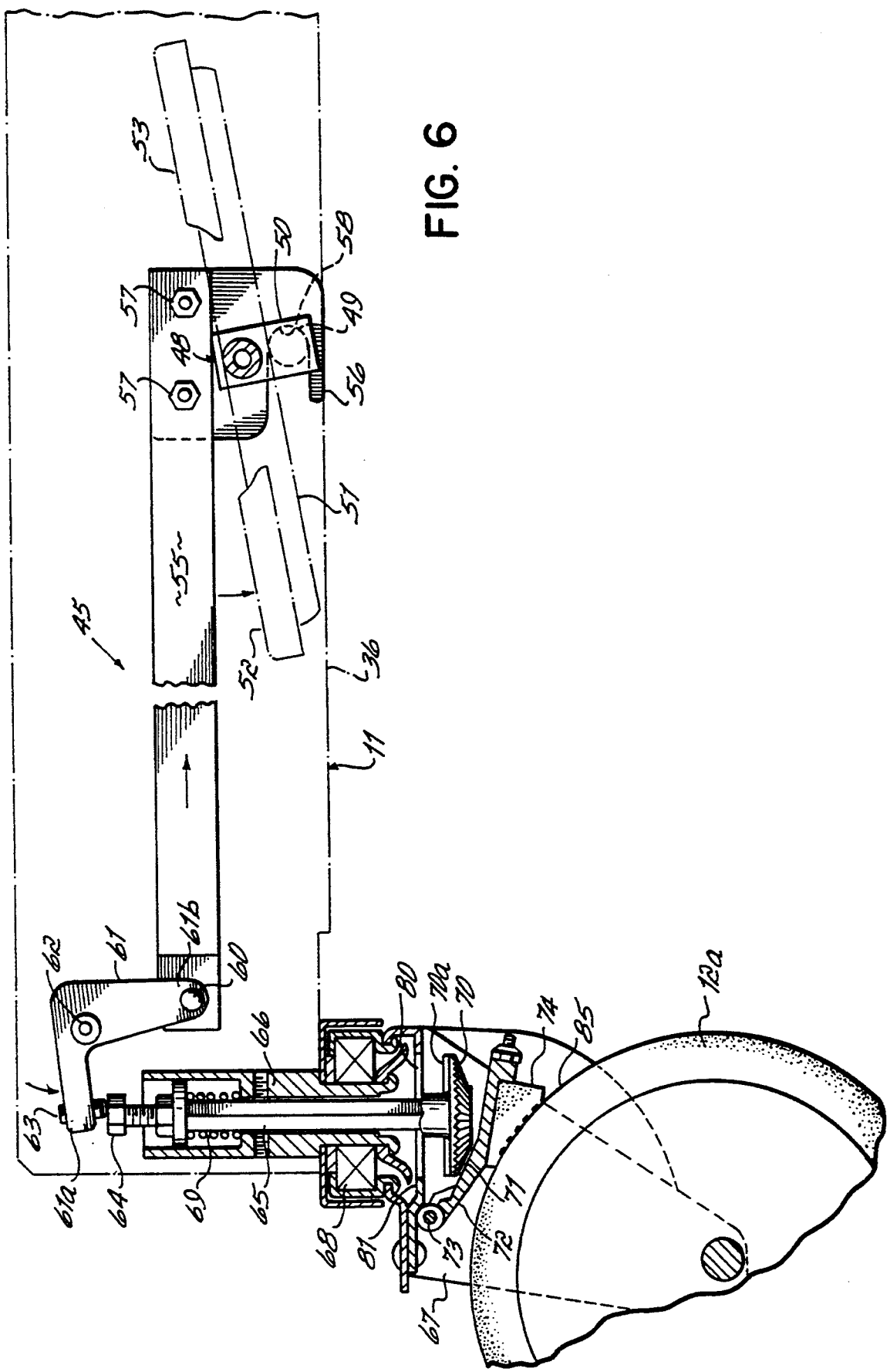
FIG. 6 is a view similar to FIGS. 4 and 5 but with the castor in the brake mode.

Referring now to FIG. 6, depressing pedal 52 beyond the horizontal position causes the castor 12a to be placed in its brake mode. Downward motion of pedal 53 causes crank 49 to cam plate 56 further away from the castor 12a, thereby pulling the link 55 therewith and further rotating the rocker arm 61 in the counter clockwise direction. Rocker arm adjusting screw 63 forces plunger 65 further downwardly until the bevel gear 70 contacts tooth 71 on the brake pad lever arm 72, forcing the lever arm 72 downwardly such that the brake pad 75 contacts the castor wheel surface 85. Depressing pedal 53 to return pedal lever 51 to a horizontal attitude causes rocker arm 61 to pivot clockwise, thereby allowing compression spring 69 to force spindle 65 upwardly thereby moving the bevel gear 70 out of contact with the tooth 71 and brake pad lever arm 72.

Referring now back to FIG. 2, and with like numbers representing like components, it will be seen that shaft half 46b similarly includes a cam 48 in the form of an offset crank 49 joined to shaft half 46b with a pair of bars 50, 50, except that the crank 49 on shaft half 46b is located at 12 o'clock, whereas the crank 49 on the shaft half 46a is located at 6 o'clock. A plate 56 with notch 58 therein is secured to a link 55 with fasteners 57. Link 55 is pivotally connected to a rocker arm 61 at 60, which rocker arm is pivotally connected to longitudinal rail 36 at 62, and includes an adjusting screw 63. The neutral/brake castor 12c is moved into and out of its neutral and brake modes the same as is the neutral/brake/steer castor 12a, the only difference being that the castor 12c includes no "steer" mode; that is to say that when the spindle 65 of the castor 12c is in its upwardmost position (as is shown in FIG. 5), wheel yoke 67 is still free to swivel with respect to plunger housing 66, the brake castor 12c including no plate 81 with slot 80 therein in which to capture rib 70 on the upperside of the bevel gear 70 in order to prohibit swiveling of wheel yoke 67 relative to spindle 65. Neutral/brake castor 12c (or simply "brake castor") is of the type manufactured by Rhombus Castors International, Inc., 20 West Stow Road, Marlton, N.J. 08053 having Part No. 372K19K150BZ98.

Figure 7:
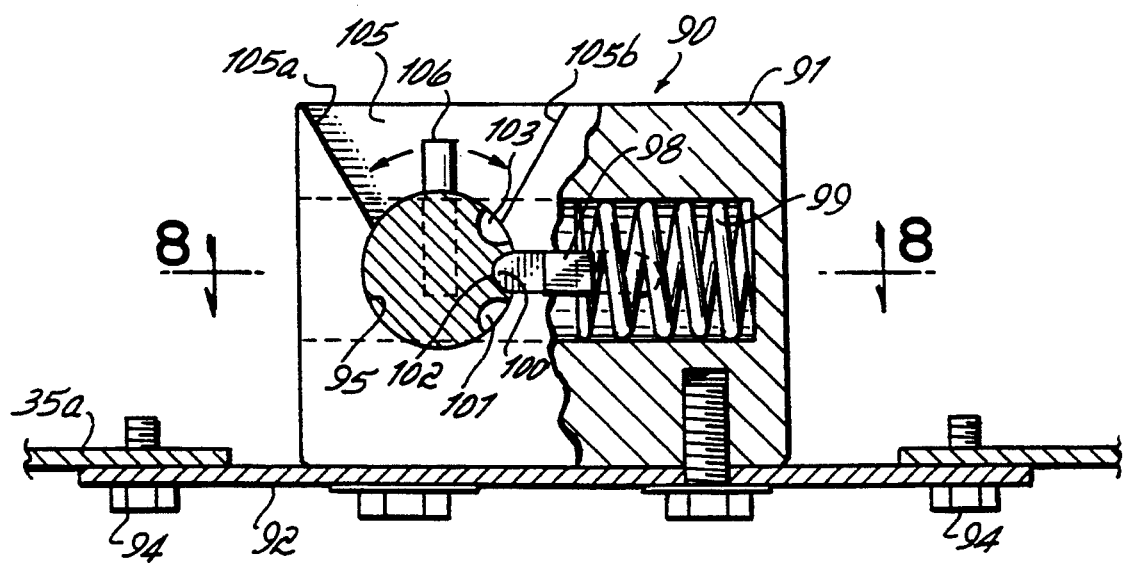
FIG. 7 is a view taken along line 7—7 of FIG. 2 illustrating a detent mechanism for use in conjunction with the linkage of the present invention.
Figure 8:
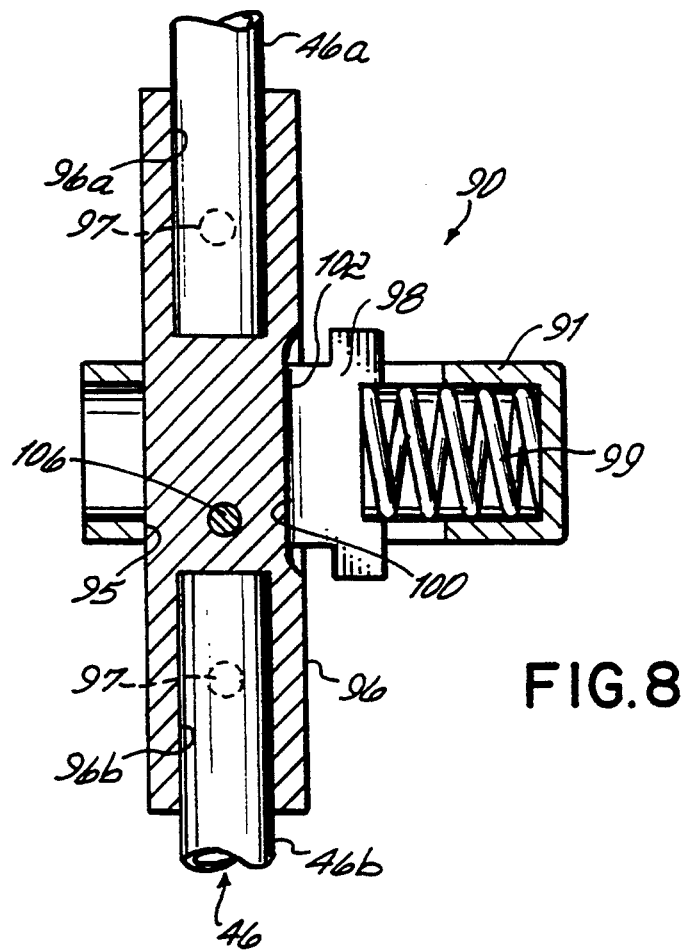
FIG. 8 is a view taken along line 8—8 of FIG. 7 further illustrating the detent mechanism for use in conjunction with the linkage of the present invention.

Referring now to FIGS. 2, 7 and 8, there is illustrated a detent mechanism 90 for maintaining shaft 36 in the three respective angular positions which correspond the neutral, brake and steer modes of castor 12a (and the neutral and brake modes of castor 12c). A block 91 is secured to access plate 92 with fasteners 93, the access plate 92 itself being removable from the lower side 35a of the transverse beam 35 via fasteners 94. Block 91 includes a bore 95 therethrough which rotatably supports a spindle 96 which has end bores 96a and 96b which receive the inboardmost ends of shaft halves 46a, 46b, respectively, which are secured therein with pins 97. Block 91 further houses a plunger 98 which is spring loaded toward bore 95 with a compression spring 99. Plunger 98 includes a plunger tip 100 which cooperates with three similarly shaped notches 101, 102 and 103 in the spindle 96. Each of the notches 101, 102 and 103 corresponds to a respective pedal lever 51 position which corresponds to the neutral, brake and steer modes of the neutral/brake/steer castor 12a and the neutral and brake modes of the neutral/brake castor 12c, the centermost notch 102 corresponding to the neutral mode, the notch 103 corresponding to the steer mode, and the notch 102 corresponding to the brake mode.

The block 91 includes a V-shaped notch 105 therein having sides 105a and 105b which serve as stops for a transverse pin 106 pressed into the spindle 96.

In the use of the present invention, pedal lever 51 will normally be positioned in a horizontal attitude thus placing neutral/brake/steer castor 12a, as well as neutral/brake castor 12c, in their respective neutral positions (FIG. 4) thus allowing the wheel yokes 67 to swivel freely relative to their respective spindle housings 66. The pedal lever 51 is maintained in a horizontal attitude by compression spring 99 which forces plunger 98 into the centermost notch 102 in the spindle 96.

Pressing pedal 53 downwardly causes each rocker arm 61 to rotate away from plunger 65, compressing spring 69 in each of the castors 12a, 12c forcing the plunger 65 upwardly. As castor 12a is a neutral/brake/steer castor, the rib 70a of bevel gear 70 is caught in the slot 80 of plate 81 thereby locking and preventing the wheel yoke 67 from swiveling relative to the spindle housing 66. Castor 12c, being simply a neutral/brake castor, still continues to swivel freely. Pedal lever 51 is maintained in this position by plunger 98 residing in notch 103. Over travel of pedal lever 51 and shaft 46 and spindle 96 is prevented by pin 106 being limited in movement by notch 105 in block 91.

To take the bed 10 out of its steer mode and to activate the brake mode of the castors 12a and 12c, to, for example, park the bed 10, pedal 52 is depressed through the middle position (horizontal attitude of brake lever 51) to the brake position (FIG. 6). Rocker arm 61 forces the plunger 65 downwardly until the bevel gear 70 contacts tooth 71 and brake pedal lever arm 72, forcing the brake pad 74 into contact with the wheel surface 85 thereby preventing the castor wheel from rotating. Pedal lever 51 is maintained in this attitude by the plunger 98 residing in the notch 101. Further, over travel of the pedal lever 51 and shaft 46 and spindle 96 is prevented by pin 106 being limited in movement by notch 105 in block 91.

Those skilled in the art will readily recognize numerous adaptations and modifications which can be made to the present invention which will result in an improved hospital bed castor control mechanism, yet all of which will fall within the spirit and scope of the present invention as defined in the following claims. Accordingly, the invention is to be limited only by the scope of the following claims and their equivalents.

What is claimed is:

1. A hospital bed comprising:
   a base;
   a patient support mounted above said base;
   castors mounted around said base and including at least one plunger type castor having a plunger actuatable to provide neutral, brake and steer modes wherein said plunger is not actuated by a cam; and
   a linkage for actuating said plunger and selectively positioning said plunger type castor in said neutral, brake and steer modes.

2. A hospital bed comprising:
   a base;
   a patient support mounted above said base;
   castors mounted around said base and including at least one plunger type castor having neutral, brake and steer modes; and
   a linkage for selectively positioning said plunger type castor in said neutral, brake and steer modes, wherein said linkage comprises:
   a shaft mounted transversely of and for rotation with respect to said base;
   a rocker arm pivotally mounted to said base and having first and second ends, said first end being adapted to actuate said plunger type castor;
   a link having first and second ends, said first link end being connected to said second rocker arm end; and
   means operably associated with said shaft and said second link end for transferring force between said second link end and said shaft;
   whereby upon selective rotation of said shaft said link pivots said rocker arm to selectively position said one plunger type castor in said neutral, brake and steer modes.

3. The hospital bed of claim 2 wherein said operably associated means comprises:
   a cam mounted on said shaft; and
   a cam follower mounted on said second link end for cooperation with said cam.

4. The hospital bed of claim 3 wherein said cam is a crank on said shaft and said cam follower is a plate mounted on said second link end having a notch adapted to receive therein said crank.

5. The hospital bed of claim 4 wherein said linkage further includes means resisting rotation of said shaft when said shaft is in respective angular positions corresponding to said neutral, brake and steer modes.

6. The hospital bed of claim 5 wherein said means resisting rotation of said shaft comprises:
   a housing having a shaft bore therethrough rotatably supporting said shaft;
   a plunger slidably mounted in said housing and spring biased forward so as to project into said shaft bore; and
   a plurality of recesses around the circumference of said shaft, each of said recesses corresponding to one of said neutral, brake and steer modes.

7. The hospital bed of claim 6 further including a pedal on said shaft for foot actuation of said shaft in first and second directions.

8. For a hospital bed having a base and castors mounted around the base including at least one plunger type castor having neutral, brake and steer modes, a linkage for selectively positioning the plunger type castor in the neutral, brake and steer modes comprising:
   a shaft adapted to be mounted transversely of and for rotation with respect to the base;
   a rocker arm adapted to be pivotally mounted to the base and having first and second ends, said first end being adapted to actuate the plunger type castor;
   a link having first and second ends, said first link end being connected to said second rocker arm end; and
   means operably associated with said shaft and said second link end for transferring force between said second link end and said shaft;
   whereby upon selective rotation of said shaft said link pivots said rocker arm to selectively position the plunger type castor in the neutral, brake and steer modes.

9. The linkage of claim 8 wherein said operably associated means comprises:
   a cam mounted on said shaft; and
   a cam follower mounted on said second link end for cooperation with said cam.

10. The linkage of claim 9 wherein said cam is a crank on said shaft and said cam follower is a plate mounted on said second link end having a notch adapted to receive therein said crank.

11. The linkage of claim 10 further including means resisting rotation of said shaft when said shaft is in respective angular positions corresponding to the neutral, brake and steer modes.

12. The linkage of claim 11 wherein said means resisting rotation of said shaft comprises:

a housing having a shaft bore therethrough rotatably supporting said shaft;

a plunger slidably mounted in said housing and spring biased forward so as to project into said shaft bore; and a plurality of recesses around the circumference of said shaft, each of said recesses corresponding to one of the neutral, brake and steer modes.

13. The linkage of claim 12 further including a pedal on said shaft for foot actuation of said shaft in first and second directions.

14. A hospital bed comprising:

a base;

a patient support mounted above said base;

castors mounted around said base and including at least one plunger type castor having a plunger actuatable to provide neutral and brake modes wherein said plunger is not actuated by a cam; and a linkage for actuating said plunger and selectively positioning said plunger type caster in said neutral and brake modes, said linkage being operable to translate said plunger but not rotate said plunger.

15. A hospital bed comprising:

a base;

a patient support mounted above said base;

castors mounted around said base and including at least one plunger type castor having neutral and brake modes; and a linkage for selectively positioning said plunger type caster in said neutral and brake modes, wherein said linkage comprises:

a shaft mounted transversely of and for rotation with respect to said base;

a rocker arm pivotally mounted to said base and having first and second ends, said first end being adapted to actuate said plunger type caster;

a link having first and second ends, said first link end being connected to said second rocker arm end; and means operably associated with said shaft and said second link end for transferring force between said second link end and said shaft;

whereby upon selective rotation of said shaft said link pivots said rocker arm to selectively position said one plunger type castor in said neutral and brake modes.

16. The hospital bed of claim 15 wherein said operably associated means comprises:

a cam mounted on said shaft; and a cam follower mounted on said second link end for cooperation with said cam.

17. The hospital bed of claim 16 wherein said cam is a crank on said shaft and said cam follower is a plate mounted on said second link end having a notch adapted to receive therein said crank.

18. The hospital bed of claim 17 wherein said linkage further includes means resisting rotation of said shaft when said shaft is in respective angular positions corresponding to said neutral and brake modes.

19. The hospital bed of claim 18 wherein said means resisting rotation of said shaft comprises:

a housing having a shaft bore therethrough rotatably supporting said shaft;

a plunger slidably mounted in said housing and spring biased forward so as to project into said shaft bore; and a plurality of recesses around the circumference of said shaft, each of said recesses corresponding to one of said neutral and brake modes.

20. The hospital bed of claim 19 further including a pedal on said shaft for foot actuation of said shaft in first and second directions.

21. For a hospital bed having a base and castors mounted around the base including at least one plunger type castor having neutral and brake modes, a linkage for selectively positioning the plunger type castor in the neutral and brake modes comprising:

a shaft adapted to be mounted transversely of and for rotation with respect to the base;

a rocker arm adapted to be pivotally mounted to the base and having first and second ends, said first end being adapted to actuate the plunger type castor;

a link having first and second ends, said first link end being connected to said second rocker arm end; and means operably associated with said shaft and said second link end for transferring force between said second link end and said shaft;

whereby upon selective rotation of said shaft said link pivots said rocker arm to selectively position the plunger type castor in the neutral and brake modes.

22. The linkage of claim 21 wherein the operably associated means comprises:

a cam mounted on said shaft; and a cam follower mounted on said second link end for cooperation with said cam.

23. The linkage of claim 22 wherein said cam is a crank on said shaft and said cam follower is a plate mounted on said second link end having a notch adapted to receive therein said crank.

24. The linkage of claim 23 further including means resisting rotation of said shaft when said shaft is in respective angular positions corresponding to the neutral and brake modes.

25. The linkage of claim 24 wherein said means resisting rotation of said shaft comprises:

a housing having a shaft bore therethrough rotatably supporting said shaft;

a plunger slidably mounted in said housing and spring biased forward so as to project into said shaft bore; and a plurality of recesses around the circumference of said shaft, each of said recesses corresponding to one of the neutral and brake modes.

26. The linkage of claim 25 further including a pedal on said shaft for foot actuation of said shaft in first and second directions.

27. A hospital bed comprising:

a base;

a patient support mounted above said base;

castors mounted around said base and including at least one plunger type castor having a plunger actuatable to provide neutral, brake and steer modes; and a linkage for selectively positioning said plunger type castor in said neutral, brake and steer modes, said linkage including a rocker arm for applying a downward force on said plunger.

28. A hospital bed comprising:

a base;

a patient support mounted above said base;

castors mounted around said base and including at least one plunger type castor having a plunger actuatable to provide neutral and brake modes; and a linkage for selectively positioning said plunger type castor in said neutral and brake modes, said linkage including a rocker arm for applying a downward force on said plunger.

29. A hospital bed comprising:

a base;

a patient support mounted above said base;

castors mounted around said base and including at least one plunger type castor having a plunger actuatable to provide neutral, brake and steer modes; and a linkage for selectively positioning said plunger type castor in said neutral, brake and steer modes, said linkage including an arm having and end for applying a downward force directly on said plunger.

30. A hospital bed comprising:

a base;

a patient support mounted above said base;

castors mounted around said base and including at least one plunger type castor having a plunger actuatable to provide neutral and brake modes; and a linkage for selectively positioning said plunger type castor in said neutral and brake modes, said linkage including an arm having and end for applying a downward force directly on said plunger.

* * * * *